N. M. MILLER.
WOODEN EAVES-TROUGH.
No. 173,037. Patented Feb. 1, 1876.
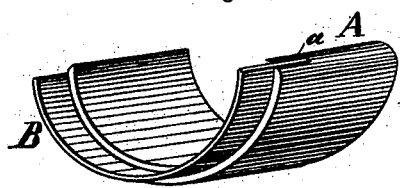
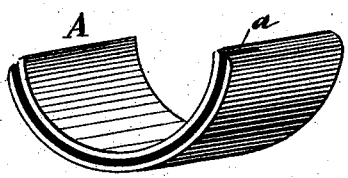
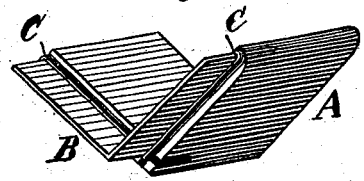
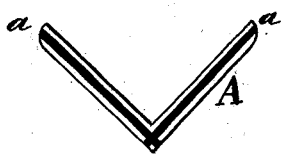

UNITED STATES PATENT OFFICE.

NILES M. MILLER, OF EVANSVILLE, INDIANA.

IMPROVEMENT IN WOODEN EAVES-TROUGHS.

Specification forming part of Letters Patent No. 173,037, dated February 1, 1876; application filed January 10, 1876.

*To all whom it may concern:*

Be it known that I, NILES M. MILLER, of Evansville, in the county of Vanderburgh and State of Indiana, have invented certain new and useful Improvements in Wooden Eaves-Troughs; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1 is a perspective view of a semicircular eaves-trough, with the connecting metal strip inserted. Fig. 2 is a similar view, showing the slot or scarf without the connecting-strip. Fig. 3 is a perspective view of a V-shaped eaves-trough, with the connecting metal strip inserted, and having also a rubber collar or gasket; and Fig. 4 is an end view of a V-shaped eaves-trough, showing the manner of cutting the slot or scarf.

Similar letters of reference indicate corresponding parts in all the figures.

This invention consists in providing wooden eaves-troughs, of any suitable shape, with a slot or scarf in both ends, cut into the ends of each piece, for the purpose of connecting them together by inserting a strip of sheet metal or any other suitable material into the said slots or scarfs, so as to form one continuous trough or gutter, having perfectly water-tight joints.

A represents an ordinary eaves-trough made of wood. After squaring off the ends I cut a scarf, $a$, longitudinally into the wood to the depth of about an inch, preferably cutting this scarf in the middle of the thickness of wood, so as to give uniform thickness and strength to the trough on both sides of the cut. These scarfs may be cut by any machinery suitable for the purpose.

When several lengths or pieces of troughing are to be put together to form one continuous gutter, a strip of sheet metal, or any other suitable material, is bent into the required shape, and inserted into the scarf $a$ in one end of each piece of troughing, as shown at B, so as to form a projecting rim or flange that will fit into the corresponding scarf cut in the end of the piece next to it. In this manner troughing may be put up to any required length, and with the joints perfectly water-tight.

When an absolutely tight joint is required a collar or gasket, C, made of rubber or any other suitable material, may be used; so that when the pieces of troughing are joined together the collar will become compressed, and absolutely prevent leakage.

I am aware that it is old to unite pieces of eaves-troughing by tacking metal strips onto the under side of the joints, or onto the inner surface of the troughs where they are joined together; but either of these methods is objectionable, because it does not give a water-tight joint, nor does it admit of a nice and even finish to the inside or outside of the trough.

By my invention no tacks are required, and the troughing may be put up or taken down in much less time, and with considerably less trouble.

Having thus described my invention, I claim and desire to secure by Letters Patent—

1. The combination of the metallic strip B and eaves-trough A, having the scaf or slot $a$, substantially as and for the purpose shown and specified.

2. The combination of the metallic strip B, rubber collar C, and eaves-trough A, having the scarf or slot $a$, substantially as and for the purpose shown and specified.

In testimony that I claim the foregoing as my own I have hereunto affixed my signature in presence of two witnesses.

NILES M. MILLER.

Witnesses:
G. R. THOMSON,
J. B. RUCKER.